Dec. 5, 1944.    I. V. TROUTMAN    2,364,110
RAIL WHEEL
Filed Feb. 8, 1943

Isaac V. Troutman,
INVENTOR.

BY Victor J. Evans & Co.
ATTORNEYS

Patented Dec. 5, 1944

2,364,110

UNITED STATES PATENT OFFICE 2,364,110

RAIL WHEEL

Isaac V. Troutman, Altoona, Pa.

Application February 8, 1943, Serial No. 475,147

1 Claim. (Cl. 295—44)

My invention relates to railroad, freight and passenger cars, and other rolling stock, and has among its objects and advantages the provision of an improved flanged wheel construction wherein the wheels are provided with steel tires operating on ball bearings independently of the axles so that the wheels of the car truck may have free relative movement when negotiating a bend in the track and thereby eliminate binding between the flanged wheels and the rails.

Figure 1:
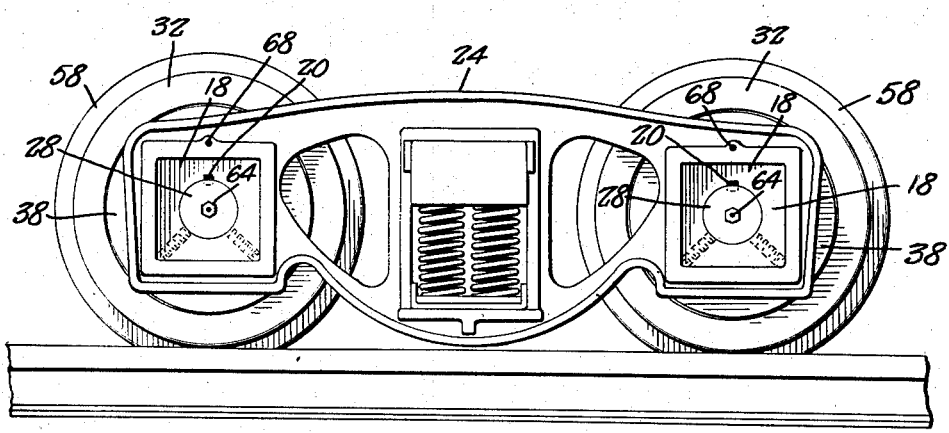
Figure 1 is a face view of a car truck illustrating my invention applied thereto.
Figure 2:
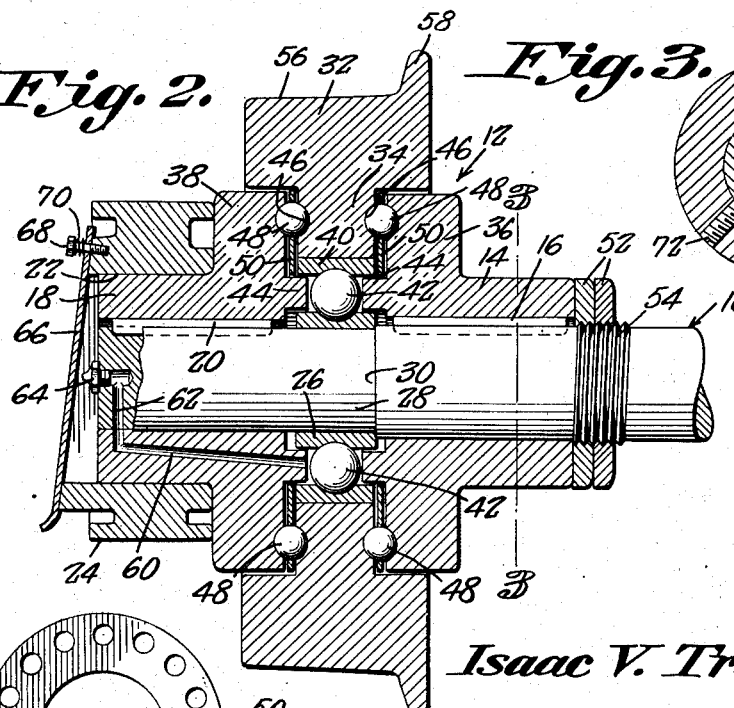
Figure 2 is an enlarged sectional view of one of the wheel structures taken in the longitudinal plane of the axle but with the latter shown in elevation.
Figure 3:
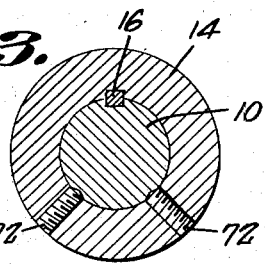
Figure 3 is a sectional view along the line 3—3 of Figure 2.
Figure 4:
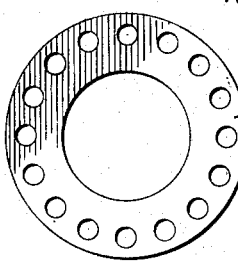
Figure 4 is a face view of one of the ball bearing spacer disks.

In the embodiment of the invention selected for illustration, Figure 2 illustrates one end of an axle 10 upon which is mounted a wheel structure 12. This wheel structure comprises a steel hub 14 mounted on the axle 10 and keyed thereto, as at 16. A second steel hub 18 is mounted on the outer end of the axle 10 and is also keyed thereto, as at 20. This hub is square to fit in the correspondingly shaped opening 22 in one end of the car truck 24, the latter being more or less conventional in other respects.

An inner ball race 26 is pressed on the end diameter 28 of the axle 10, which diameter is slightly smaller than the remainder of the axle to provide an annular shoulder 30 against which the race 26 is pressed. A wheel tire 32 is mounted about and between the hubs 14 and 18, this tire having an annular flange 34 lying between flanges 36 and 38 on the hubs 14 and 18, respectively. An outer bearing race 40 is pressed inside the annular flange 34, and ball bearings 42 are interposed between the two bearing races 26 and 40. An annular flange 44 is formed on each flange 36 and 38, which flanges lie between the bearing races 26 and 40 and between which the ball bearings 42 are positioned.

The flange 34 is provided with two bearing races 46 coaxial with the axis of the axle 10 and for coaction with ball bearings 48. These bearings function as thrust bearings for the wheel tire 32, the load being carried by the ball bearings 42. Ball bearing spacer disks 50 are provided for the bearings 48 and lie between the side faces of the flange 34 and the flanges 36 and 38.

Lock nuts 52 are threadedly connected at 54 with the axle 10 for coaction with the hub 14. The tire 32 has a rail engaging face 56 and a flange 58, the face and the flange being conventional. An oil bore 60 is provided in the hub 18 and has communication with a bore 62 in the axle 10, the latter bore communicating with a lubricant fitting 64 through the medium of which the lubricant may be introduced under pressure for lubricating the ball bearings 42, as well as the ball bearings 48. A cover plate 66 is mounted loosely on a bolt 68 threaded into the truck 24, with a compression spring 70 mounted on the bolt and interposed between the head thereof and the plate 66, to yieldingly hold the latter in its closed position of Figure 2.

The hub 14 is made additionally secure to the axle 10 through the medium of set screws 72.

In operation, the tire 32 is mounted for free relative movement about the axis of the axle 10. All the wheels are similarly constructed so that the rims are independently rotatably mounted on their respective axles. Thus the tires may rotate relatively to each other to compensate for variable distances traveled when passing over the curved track. This eliminates any binding engagement between the flanged wheel tires and the rails, which is an objectionable feature in wheels fixedly attached to the axles. In the instant case, the axle is a fixed proposition, and eliminates the necessity of costly journal brasses. Additional loads may also be carried at a reduced cost because of the free rolling nature of the wheel tires. Excessive wear of the inner faces of the heads of the rails is also eliminated.

Without further elaboration, the foregoing will so fully explain my invention that others may, by applying current knowledge, readily adapt the same for use under various conditions of service.

I claim:

In a rail guided and supported wheel, hubs spaced on said axle and fixed thereto, said hubs having annular flanges spaced one from the other but arranged coaxially of said axle, a bearing race fitted on said axle, a wheel tire having a second annular flange, radial flanges on said hubs overlapping said second annular flange, a bearing race fitted inside said second annular flange, ball bearings interposed between said first and second mentioned races, ball bearings interposed between said second annular flange and said radial flanges, a truck member supporting one of said hubs, lock nuts threadedly connected with said axle for coaction with the other hub, said axle and one of said hubs being provided with a lubricant introducing bore for admitting lubricant to the space between said first mentioned annular flanges, said first mentioned annular flanges being closely positioned on opposite sides of said first mentioned ball bearings, and a cap means covering the receiving end of said bore.

ISAAC V. TROUTMAN.